Dec. 8, 1925.    E. A. SMITH    1,564,373
WEEDER
Filed Feb. 16, 1924
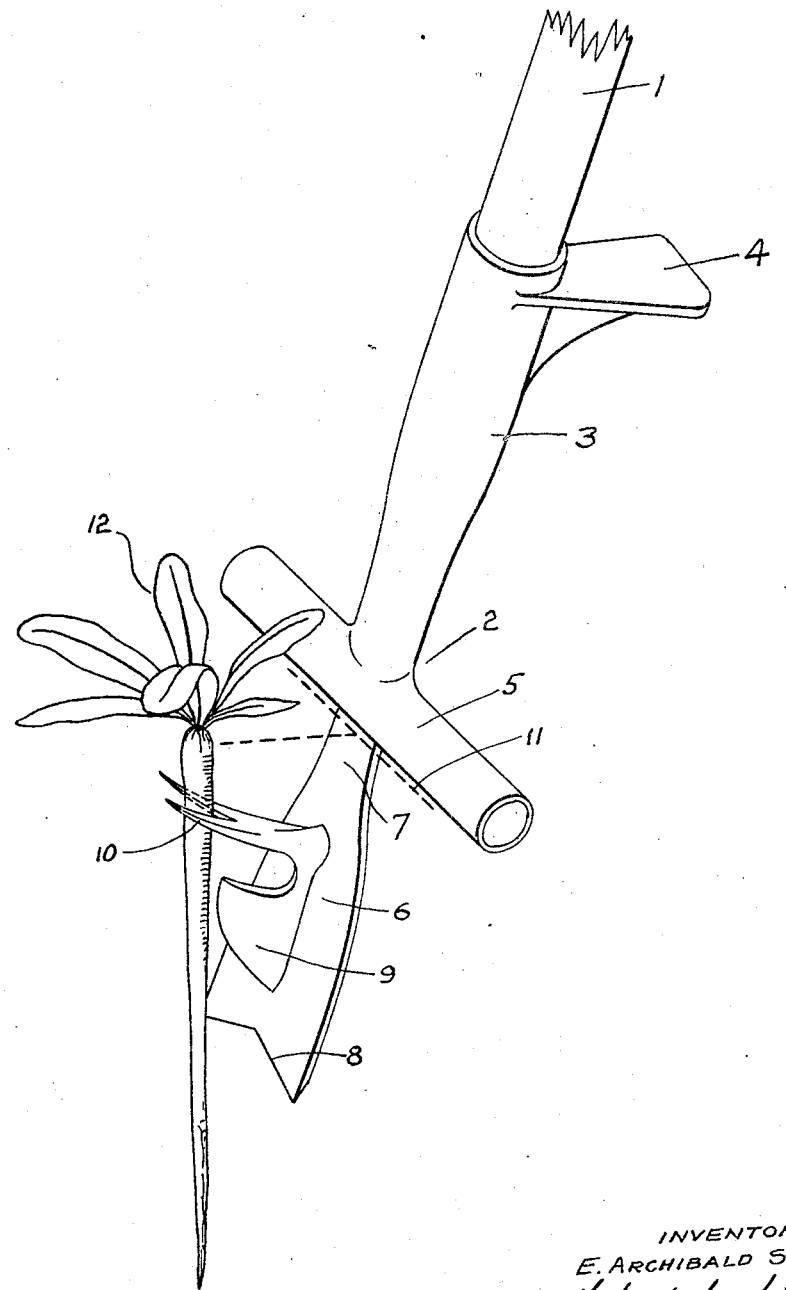
INVENTOR
E. ARCHIBALD SMITH
BY Featherstonhaugh & Co
ATTORNEYS Patented Dec. 8, 1925.

1,564,373

UNITED STATES PATENT OFFICE.

EDWARD ARCHIBALD SMITH, OF VANCOUVER, BRITISH COLUMBIA, CANADA.

WEEDER.

Application filed February 16, 1924. Serial No. 693,332.

*To all whom it may concern:*

Be it known that I, EDWARD ARCHIBALD SMITH, a subject of the King of Great Britain, and a resident of the city of Vancouver, in the Province of British Columbia, Canada, have invented certain new and useful Improvements in Weeders, of which the following is a specification.

My invention relates to improvements in weeders the objects of which are first to provide in a weeder means whereby incisions are made in the turf so that the weeds are lifted without damage to the turf from which they are removed, second to provide an extracting fork which will engage the root of the weed below the ground surface that it may be entirely withdrawn from the ground instead of being broken off as is common with other types of weeders, and third to provide a suitable fulcrum and leverage that the extracting fork may be brought into definite engagement with the root prior to its extraction.

The invention consists essentially of a shaft upon which blades are fitted for cutting through the turf and an extracting fork carried by one of the blades for withdrawing the weeds, as will be more fully described in the following specification, in which:

The drawing is a general view of my invention.

The numeral 1 indicates the handle of my weeder by which the tool is operated. 2 indicates the tool generally, 3 being a tubular socket into which the handle is fitted, 4 is a step extending rearwardly of the upper end of the socket 3 for the purpose of driving the tool by foot pressure into the ground. 5 indicates a cross bar extending transversely of the tool which on being driven to the turf surface limits the cut of the tool and forms a fulcrum therefore. 6 is a transverse blade extending downwardly from a relatively narrow neck 7 under the cross bar 5 and increasing in width to the V-shaped cutting edge 8, carried upon the front of the blade 6 is a longitudinally disposed cutter 9 formed somewhat after the fashion of an arrow head and above it, also carried by the blade 6 is a fork 10 which projects an appreciable distance beyond the forward edge of the blade.

The dotted lines 11 represent the T-shaped incisions made by inserting tool into the ground and 12 indicates a weed to be withdrawn.

Having thus described the several parts of my invention I will now explain the manner in which it is used.

The weeder is set at a suitable distance from the weed to be drawn and pressure applied to the shaft 1 and if necessary upon the step 4 also, driving the blade 6 through the turf at an angle, the cutter 9 making an incision which permits the fork to pass through the turf without effort. When the depth limit is reached the shaft is first pulled slightly rearward, pivoting upon the cross-bar and the blade moving in a corresponding forward direction to disturb the soil about the root of the weed to detach it therefrom and to open the turf at the incision, the shaft is then pushed forward with the cutting edge 8 forming a fulcrum, the fork engaging the root of the weed to extract it, when the tool is withdrawn in a substantially vertical direction. The ground being cut alongside of the root frees it to such an extent that it is withdrawn without breaking.

It will thus be seen that I have invented a weeder which effectively lifts weeds with their roots unbroken from the ground in such a manner that the disturbance of the soil or turf from which it was removed can be readily flattened out.

What I claim as my invention is:

1. A weeder comprising a blade mounted upon an operating shaft, an extracting fork extending at right angles from the blade, and a cross bar for limiting the depth of the cut of the blade.

2. A weeder comprising a blade mounted upon an operating shaft, an extracting fork extending at right angles from the blade, and means for applying foot pressure to the blade.

3. A weeder comprising a blade mounted upon an operating shaft, an extracting fork extending at right angles from the blade, and a means for forming an incision in the ground for the admission of the extracting fork.

4. A weeder comprising a blade mounted upon an operating shaft, a cutter extending at right angles to the face of the blade and co-acting therewith to form a T-shaped incision in the ground, an extracting fork horizontally disposed above the cutter and a cross bar for limiting the depth of the cut of the blade.

5. A weeder comprising a handle member, a blade carried thereby adapted to form a T-shaped incision in the earth, and root lifting means extending therefrom for engaging the weed when the inserted tool is swung forward.

Dated at Vancouver, B. C., this 23rd day of January, 1924.

E. ARCHIBALD SMITH.